(12) United States Patent
Hegde et al.

(10) Patent No.: US 10,572,506 B2
(45) Date of Patent: Feb. 25, 2020

(54) SYNCHRONIZING DATA STORES FOR DIFFERENT SIZE DATA OBJECTS

(71) Applicant: salesforce.com, inc., San Francisco, CA (US)

(72) Inventors: Dhiraj Hegde, San Jose, CA (US); Jesse Yates, San Francisco, CA (US); Lars Hofhansl, Orinda, CA (US)

(73) Assignee: salesforce.com, inc., San Francisco, CA (US)

( * ) Notice: Subject to any disclaimer, the term of this patent is extended or adjusted under 35 U.S.C. 154(b) by 325 days.

(21) Appl. No.: 15/452,471

(22) Filed: Mar. 7, 2017

(65) Prior Publication Data

US 2018/0260465 A1 Sep. 13, 2018

(51) Int. Cl.
*G06F 17/30* (2006.01)
*G06F 16/27* (2019.01)
*G06F 16/245* (2019.01)
*G06F 16/28* (2019.01)

(52) U.S. Cl.
CPC .......... *G06F 16/273* (2019.01); *G06F 16/245* (2019.01); *G06F 16/282* (2019.01); *G06F 16/289* (2019.01)

(58) Field of Classification Search
CPC .. G06F 16/273; G06F 16/2219; G06F 16/289; G06F 16/245; G06F 16/282
See application file for complete search history.

(56) References Cited

U.S. PATENT DOCUMENTS

| 8,370,294 B2* | 2/2013 | Lyakhovitskiy | G06F 16/10 707/609 |
|---|---|---|---|
| 9,292,699 B1* | 3/2016 | Stuntebeck | G06F 16/13 |
| 9,396,290 B2* | 7/2016 | Ogasawara | G06F 16/282 |
| 9,672,267 B2* | 6/2017 | Ogasawara | G06F 16/282 |
| 2010/0153336 A1* | 6/2010 | Zak | H04L 67/1095 707/610 |
| 2015/0095308 A1* | 4/2015 | Kornacker | G06F 16/258 707/718 |
| 2016/0335104 A1* | 11/2016 | Elias | G06F 13/102 |
| 2016/0335158 A1* | 11/2016 | De Schrijver | G06F 11/1076 |
| 2017/0060744 A1* | 3/2017 | Saitou | G06F 3/0647 |
| 2017/0060918 A1* | 3/2017 | Iyer | G06F 16/185 |

* cited by examiner

*Primary Examiner* — Jeff A Burke
*Assistant Examiner* — Fernando M Mari
(74) *Attorney, Agent, or Firm* — Holland & Hart LLP

(57) ABSTRACT

A system may be configured to implement two or more different types of data stores for data storage. For example, the system may include a small object data store and a large object data store. The system may compare the size of a data file to a predetermined threshold size. If the data file is smaller than the predetermined threshold size, the system may write the data to the small object data store. If the data is larger than the predetermined threshold size, the system may write an intent message to the small object data store referencing the data in the large object data store, and may write the data to the large object data store. The system may update the intent message in the small object data store to indicate that the data was successfully written.

19 Claims, 11 Drawing Sheets

SYNCHRONIZING DATA STORES FOR DIFFERENT SIZE DATA OBJECTS

FIELD OF TECHNOLOGY

The present disclosure relates generally to database systems and data storage, and more specifically to synchronizing data stores for different size data objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may process a large number of data blocks that vary in size by orders of magnitude. To store the data blocks, the cloud platform may include a data store. However, a data store may be configured to efficiently store only a certain number of data blocks or data blocks within a certain size range. Therefore, the cloud platform may experience inefficiencies or other reductions in performance when attempting to store a large number of data blocks that vary widely in size.

DETAILED DESCRIPTION

Figure 1:
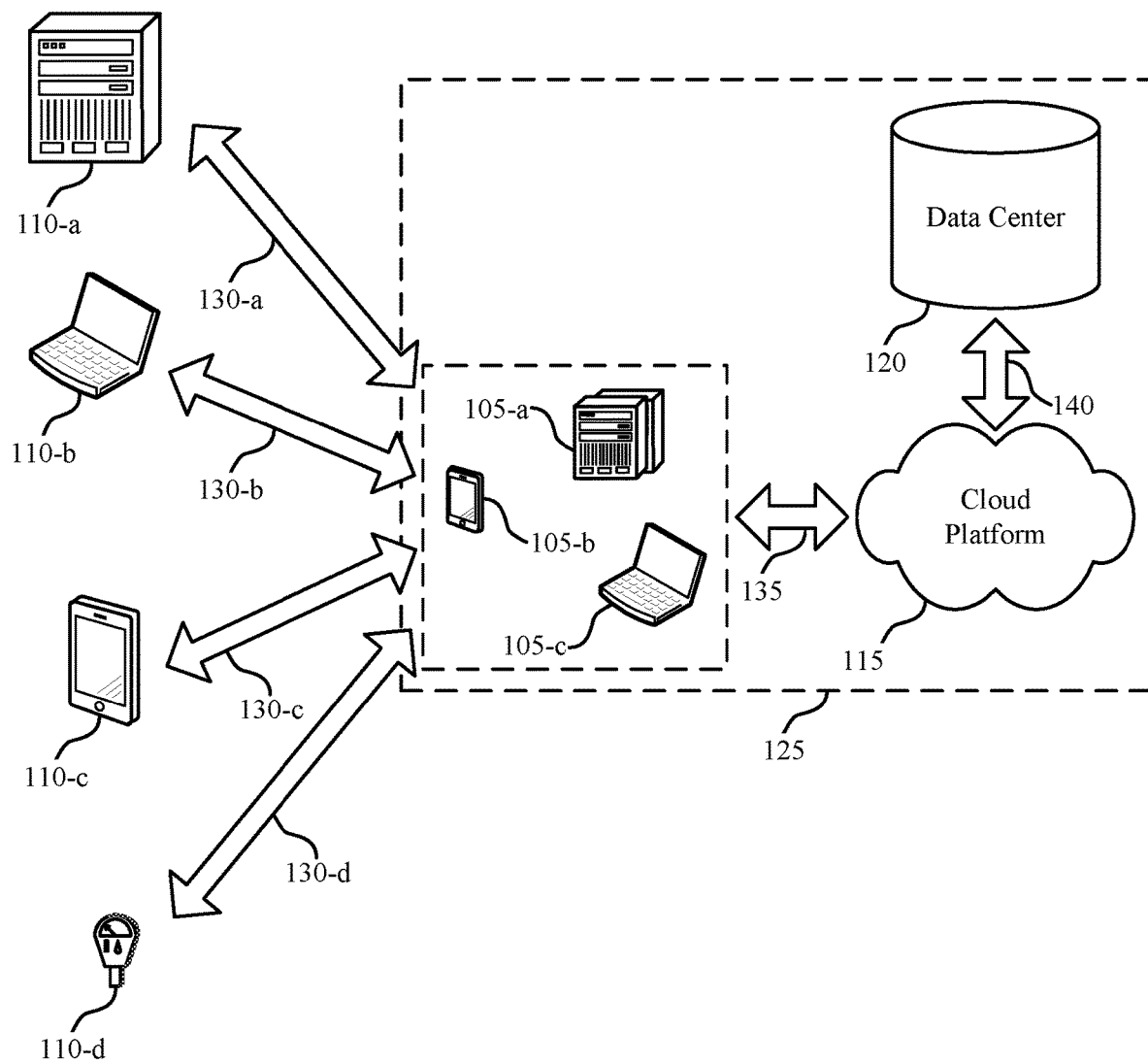
FIG. 1 illustrates an example of an environment for data processing that supports synchronizing data stores for different size data objects in accordance with aspects of the present disclosure.

A database system may be configured to store large amounts of data (e.g., tens of terabytes per day). To handle the storage and analysis of large amounts of data, the database system may be structured as a distributed system instead of a relational database management system (RDBMS). For example, the distributed system may be configured to operate on commodity hardware, and therefore may be scaled by adding more nodes (e.g., machines or clusters of machines). The distributed system may include one or more data stores configured to store the individual data blocks.

A data store may be configured to store data blocks within a certain size range to optimize performance. For example, a data store may be configured to store billions of data files that are approximately 100 megabytes (MB) or less. A data store may instead be configured to store larger data blocks (e.g., larger by orders of magnitude), but may be limited to storing less of them. Therefore, a database system that uses only one of these types of data stores may operate inefficiently when tasked with storing large amounts of files that vary widely in size.

In accordance with aspects of the present disclosure, a database system may include both a data store configured for relatively smaller files and a data store configured for relatively larger files. As discussed below, the relative size of the files may be based on a comparison with a predetermined threshold size. The database system may be configured to write a data file to either the small file data store or the large file data store based on the size of the data file. In this way, the database system may be configured to efficiently handle a large number of data files that vary widely in size.

A database system using multiple types of data stores may also include a system for ensuring that the data stores remain in sync with each other. In a large distributed system with many arrays of machines, it may be difficult to keep track of which data store that data was written to, where on the data store the data was written, or whether the data was successfully written to a data store. In accordance with aspects of the present disclosure, the database system may store metadata associated with a data file on a first data store while the actual data is written to a second data store. The metadata associated with a data file may include an intent to write the data to a particular location on the second data store. Once the data is successfully written to the second data store, the intent in the first data store may be updated to indicate the successful write operation. In this way, the metadata on the first data store helps keep track of where on the second data store the data was written and whether the data was successfully written.

Aspects of the disclosure are initially described in the context of systems supporting synchronizing data stores for different size data objects in accordance with aspects of the present disclosure. Aspects of the disclosure are further illustrated by and described with reference to process flow diagrams, apparatus diagrams, system diagrams, and flowcharts that relate to synchronizing data stores for different size data objects.

FIG. 1 illustrates an example of an environment 100 for cloud computing that supports synchronizing data stores for different size data objects in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

In some cases, data center 120 may include different types of data stores. For example, data center 120 may include both a Hadoop Distributed File System (HDFS) database and a HBase database. HDFS is a distributed filesystem that uses sequential access to retrieve data. HDFS typically stores data objects in data blocks with a default size of 64 MB, and may efficiently stream large data objects (e.g., data objects of this size or larger). However, HDFS may be inefficient in storing small data objects (i.e., data objects significantly smaller than the 64 MB block size) because of the large number of seeks the filesystem must perform to search through the many data objects. Additionally, HDFS stores metadata related to each data object in the memory of a single master cluster. This metadata storage may exceed the memory capabilities of a master cluster for large numbers of data objects (e.g., tens of millions or billions).

HBase, on the other hand, may be implemented on top of HDFS to offer random access capabilities. HBase stores data objects in data blocks with a default size of 64 kilobytes (KB), $\frac{1}{1024}$ of the typical size of HDFS data blocks. The processor performance for inputting a data object into HBase is independent of the number of data objects already stored in HBase, and the random access capabilities allow HBase data retrieval to scale well with large numbers of data objects. However, large files (i.e., files significantly larger than the 64 KB block size) may cause inefficient random access data retrieval in HBase.

Data center 120 may improve data storage and retrieval efficiency by storing data objects smaller than a threshold size in HBase and data objects larger than the threshold size in HDFS. Data center 120 may receive data to store from a cloud client 105. Data center 120 may process the data to determine whether to write the data to HBase or HDFS. Data center 120 may compare the data to the threshold size, and may store data smaller than (or equal to) the threshold size to HBase. If the data is larger than (or equal to) the threshold size, data center 120 may write an intent to write the data to HDFS in HBase, may write the data to HDFS based on the intent, and may update the intent in HBase to indicate where the data is stored in HDFS and when the data is written successfully. If a cloud client 105 requests data from data center 120, data center 120 may search for the data in HBase. In some cases, data center 120 may identify the data in HBase, and in other cases data center 120 may identify the location of the data in HDFS based on the indication in HBase. Data center 120 may then send the identified data to cloud client 105.

Figure 2:
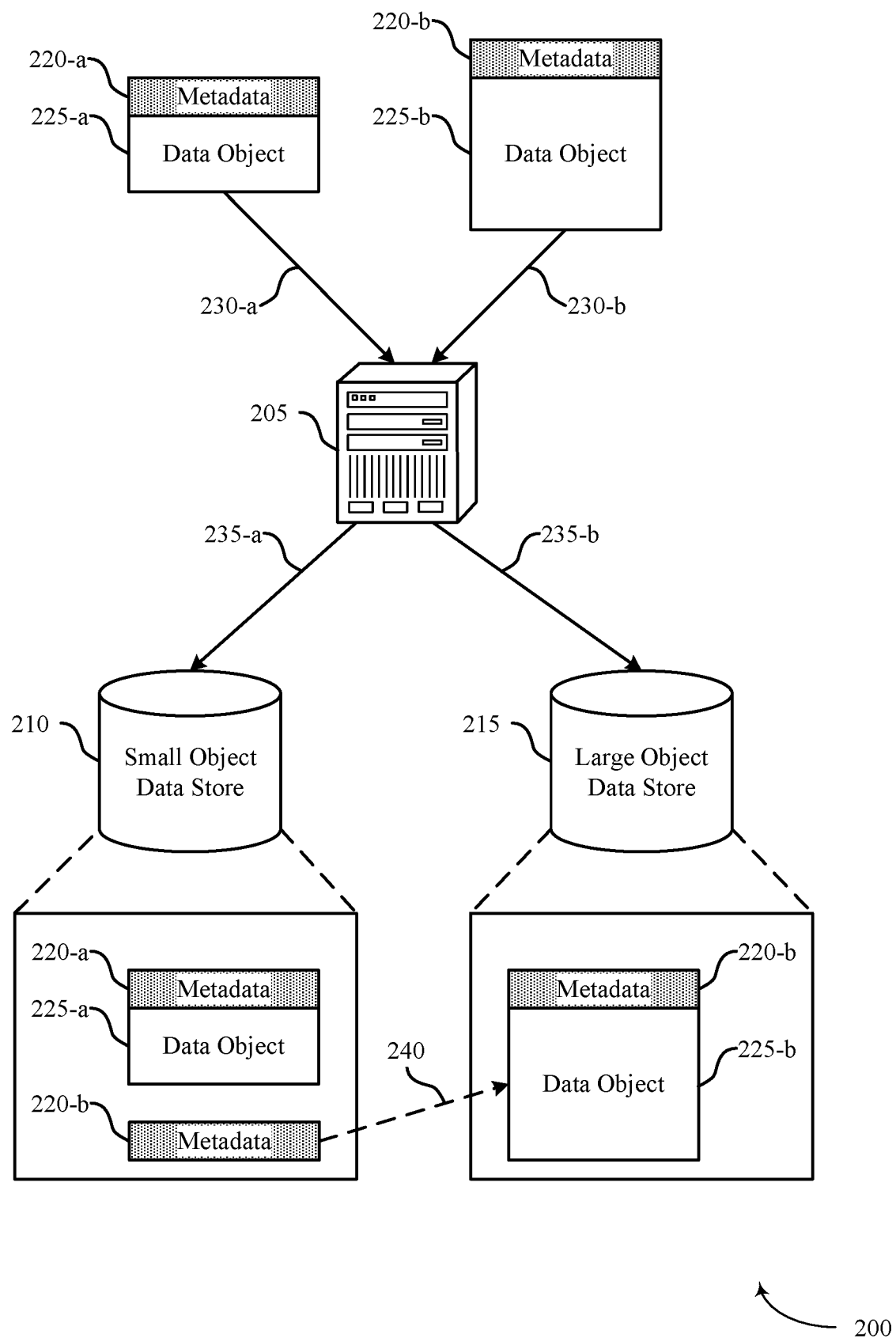
FIG. 2 illustrates an example of a system that supports synchronizing data stores for different size data objects in accordance with aspects of the present disclosure.

FIG. 2 illustrates an example of a system 200 for data storage that supports synchronizing data stores for different size data objects in accordance with various aspects of the present disclosure. The system 200 may include a component (e.g., server 205) for processing data, determining which data store to write the data to, and searching the data stores for requested data objects. The system 200 may include multiple data stores, such as a small object data store 210 and a large object data store 215. It should be understood that the terms small and large are based on a comparison to a predetermined size threshold, which as discussed below, may be configurable. In some cases, the described functionality associated with server 205 may be performed by components of either the small object data store 210 or the large object data store 215. In some cases, the system 200 may include additional servers or other data processing components than server 205 to provide the functionality described below. In other cases, the system 200 may include additional data stores than the two shown. In accordance with aspects of the present disclosure, the system 200 may store data in a data store based on the size of the data.

The system 200 may be configured to process and store large amounts of data of widely varying sizes (e.g., billions of data objects ranging in size by several orders of magnitude). The different data stores of system 200 may be configured (e.g., optimized) to store data objects within a particular size range (e.g., data objects less than 100 megabytes). For example, a small object data store 210 (e.g., HBase) may be configured to efficiently store large quantities (e.g., millions or billions) of data objects and the associated metadata that are smaller than a particular threshold size. A large object data store 215 (e.g., HDFS) may be configured to efficiently store data objects larger than the particular threshold size.

The system 200 (e.g., at server 205) may receive a request to write data (e.g., a data object 225, such as a binary large object (BLOB), and metadata 220 associated with the data object 225) to a data store. The server 205 may determine whether to write the data to the small object data store 210 or the large object data store 215 based on comparing the size of the data object 225 to the threshold size. A data storage system including both the small object data store 210 and the large object data store 215 may be referred to as a mixed store, a BLOB store, or an HStore.

The server 205 may receive data to store in the mixed store. In some examples, the data may be referred to as a BLOB or a data object 225. The server 205 may compare the size of the data (e.g., the size of the data object 225) to a predetermined threshold size. In some cases, the server 205 may compare the size of the combination of the metadata 220 and the data object 225 to the predetermined threshold size. The predetermined threshold size may be configurable by a user or automatically configured by the system 200 to maintain certain data allocations between the two stores. For example, the threshold size may be configured such that a predetermined percentage of data objects 225 (e.g., 90% of all data objects) are stored in the small object data store 210 and/or a predetermined percentage of the total size of data (e.g., 90% of the total data measured in megabytes) is stored in the large object data store 215.

The server 205 may receive data including first metadata 220-a and first data object 225-a over communication link 230-a. The server 205 may determine that the size of first data object 225-a is smaller than (or equal to) a predetermined threshold size. In these cases, the server 205 may write the data (e.g., data object 225-a and any associated metadata 220-a) to the small object data store 210 (e.g., via communication link 235-a). In some cases, an indication of the data (e.g., associated metadata 220-a, a data object identifier, or a combination of the two) may be stored in a key of a key-value pair, while data object 225-a may be stored in a value of the key-value pair.

The server 205 may receive another piece of data including second metadata 220-b and second data object 225-b over communication link 230-b. The server 205 may determine that the size of data object 225-b is larger than (or equal to) the predetermined threshold size. In these cases, the server 205 may write an intent (i.e., an intent to write the data object to a large object data store 215) in the small object data store 210 via communication link 235-a. For example, the intent may include storing metadata 220-b associated with data object 225-b, a data object identifier corresponding to data object 225-b, an indication that there is an intent to write data object 225-b to the large object data store 215, or a combination of the above. The intent may be stored in a key of a key-value pair. Additionally, the intent may include storing a reference 240 to a location (e.g., an address) in the large object data store 215 in a value of the key-value pair. The server 205 may then write data object 225-b to the large object data store 215 (e.g., via communication link 235-b). In some cases, the server 205 may additionally write metadata 220-b associated with data object 225-b to the large object data store 215. The server 205 may write data object 225-b and associated metadata 220-b in the location indicated by the reference 240.

When data object 225-b is completely written in the large object data store 215, the server 205 may update the intent in the small object data store 210. In one example, the large object data store 215 may send a confirmation message to the small object data store 210 confirming data object 225-b was written in the referenced location, and the small object data store 210 may update the intent based on the confirmation message. In another example, the server 205 may periodically run a backup process. The backup process may search the metadata of the small object data store 210, and identify any intents (e.g., the intent including metadata 220-b and associated with data object 225-b) and corresponding referenced locations in the large object data store 215. The backup process may determine if data object 225-b was written in the referenced location in the large object store 215, and may update the intent based on the determination. Updating the intent may include updating the indication that there is an intent to write data object 225-b to the large object data store 215 to indicate that data object 225-b has successfully been written to the large object data store 215. The three step process of writing an intent, writing the data based on the intent, and updating the intent may synchronize data stored in the small object data store 210 with data stored in the large object data store 215.

In some cases, the system 200 may receive a request message that includes a retrieval request for a data object 225. The server 205 may first search the small object data store 210 for the requested data object 225. For example, the server 205 may search the keys in the small object data store 210, and may identify a key-value pair with metadata 220 or a data object identifier associated with the requested data object 225 included in the key. In an example where the requested data object 225 is smaller than the predetermined threshold size, the requested data object 220 may be included in the value of the identified key-value pair. In another example where the requested data object 225 is larger than the predetermined threshold size, a reference 240 to a location in the large object data store 215 may be included in the value of the identified key-value pair. The server 205 may search the large object data store 215 at the referenced location, and may identify the requested data object 225 stored at the referenced location. In either case, the system 200 may surface the requested data object 225 to the requesting user or system (e.g., by sending the requested data object 225 to a user interface, to be displayed to the user).

In one example, the small object data store 210 is an HBase data store, the large object data store 215 is a HDFS data store, and the predetermined threshold size is set at 64 KB. The server 205 may receive a data object 225 and compare the size of the data object 225 with the predetermined threshold size. The server 205 may determine that the data object 225 is smaller than (or equal to) the predetermined threshold size, and may store the data object 225 in HBase as a result. The storage process may include storing an identifier of the data object 225 and metadata 220 associated with the data object 225 in a key of a key-value pair, and storing the data associated with the data object 225 in a value of the key-value pair.

The server 205 may receive a second data object 225 for storage. The server 205 may compare the size of the second data object 225 to the predetermined threshold size and may determine that the second data object 225 is larger than (or equal to) the predetermined threshold size. In this case, the server 205 may store an intent in HBase. The intent may include an identifier of the second data object 225 and metadata 220 associated with the second data object 225 in a key of a key-value pair, and an indication of an address in HDFS in the value of the key-value pair. The server 205 may then write the second data object 225 to HDFS at the address indicated in HBase.

In some cases, an error may occur when writing the second data object 225 to HDFS. After a predetermined amount of time (e.g., one minute), the server 205 may determine that HBase did not receive a confirmation message that the intent to write the second data object 225 was successful. In this case, the server 205 may search HDFS at the address indicated in HBase, and may determine that an error occurred. In some cases, the server 205 may retry to write the second data object 225 to the same address in HDFS. In other cases, the server 205 may modify the intent in HBase to reference a different address in HDFS. The server 205 may then try to write the second data object 225 to HDFS at the different address indicated in HBase. If the second data object 225 is successfully written to HDFS, the server 205 may send a confirmation message to HBase that the second data object 225 was successfully written, and in response, HBase may update the intent to indicate that the second data object 225 was successfully written at the indicated address in HDFS.

Figure 3:
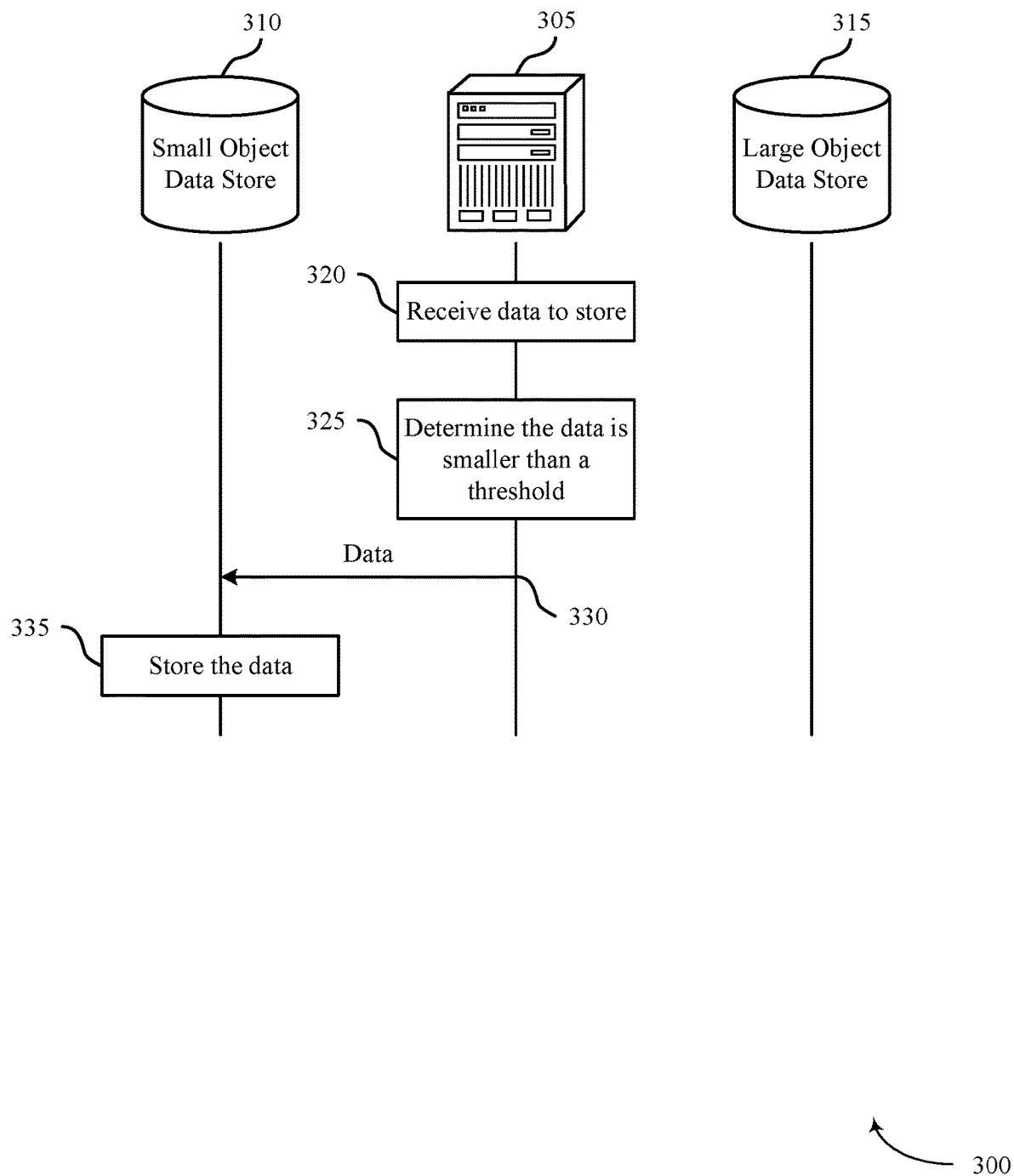
FIGS. 3 through 5 illustrate examples of process flow diagrams that support synchronizing data stores for different size data objects in accordance with aspects of the present disclosure.

FIG. 3 illustrates an example of a process flow 300 that supports synchronizing data stores for different size data objects in accordance with various aspects of the present disclosure. Server 305 may be an example of a server 205, as described with reference to FIG. 2, and may be a component of any part of a system 125, as described with reference to FIG. 1. Small object data store 310 and large object data store 315 may be examples of the small object data store 210 and the large object data store 215, respectively, as described with reference to FIG. 2. In some cases, these may be components of a data center 120, as described with reference to FIG. 1. Process flow 300 illustrates an example of writing a data object to a small object data store 310 in a system configured to synchronize data stores for different size data objects.

At 320, server 305 may receive data and an associated data identifier (e.g., metadata) to store. In some cases, server 305 may receive a write request message, which may include the data and data identifier.

At 325, server 305 may compare a size of the data to a predetermined size threshold. In some examples, server 305 may compare the total size of the data and the data identifier (or other associated metadata) to the threshold. Server 305 may determine that the size of the data is smaller than (or equal to) the threshold.

At 330, server 305 may send the data to small object data store 310. Server 305 may send the data and the associated data identifier together to be written to small object data store 310. Sending the data may be based on the determination that the size of the data is smaller than (or equal to) the threshold.

At 335, small object data store 310 may store the data. In some cases, small object data store 310 may store data as key-value pairs. In these cases, small object data store 310 may store the data identifier as the key of a key-value pair, and may store the data as the value of the key-value pair.

Figure 4:
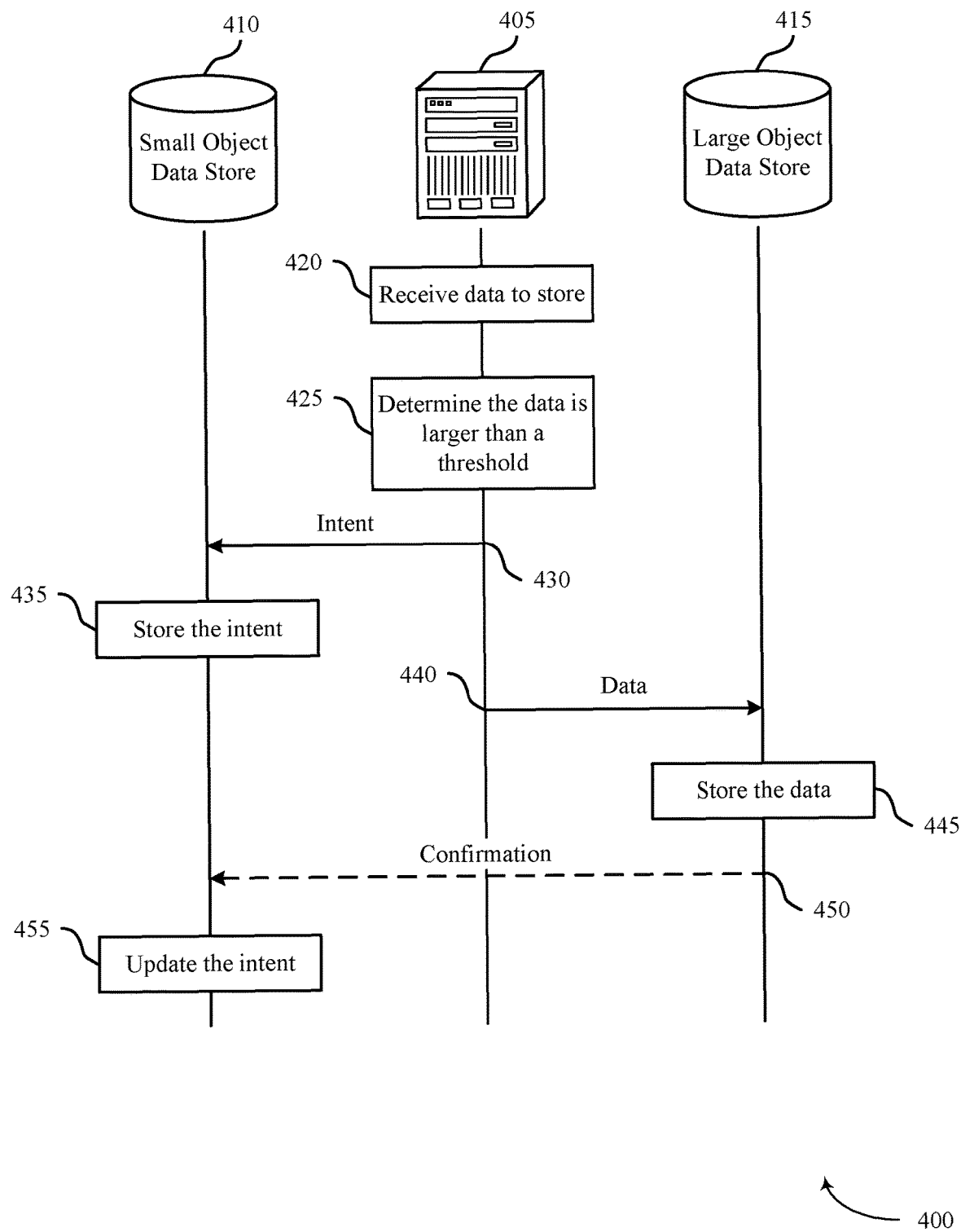

FIG. 4 illustrates an example of a process flow 400 that supports synchronizing data stores for different size data objects in accordance with various aspects of the present disclosure. Server 405 may be an example of a server 205, as described with reference to FIG. 2, and may be a component of any part of a system 125, as described with reference to FIG. 1. Small object data store 410 and large object data store 415 may be examples of the small object data store 210 and the large object data store 215, respectively, as described with reference to FIG. 2. In some cases, these may be components of a data center 120, as described with reference to FIG. 1. Process flow 400 illustrates an example of writing a data object to a large object data store 415 in a system configured to synchronize data stores for different size data objects.

At 420, server 405 may receive data and an associated data identifier (e.g., metadata) to store. In some cases, server 405 may receive a write request message, which may include the data and data identifier.

At 425, server 405 may compare a size of the data to a threshold. In some cases, server 405 may compare the total size of the data and the data identifier (or other associated metadata) to the threshold. Server 405 may determine that the size of the data is larger than (or equal to) the threshold.

At 430, server 405 may send an intent message to small object data store 410. The intent message may represent an intent to write the data to large object data store 415. The intent message may include the associated data identifier (e.g., metadata) and a reference to a location in large object data store 415. Server 405 may intend to write the data to the referenced location in large object data store 415.

At 435, small object data store 410 may store the intent message. In some cases, small object data store 410 may store data as key-value pairs. In these cases, small object data store 410 may store the intent message by storing the associated data identifier as the key of a key-value pair, and storing the reference to a location in large object data store 415 as the value of the key-value pair.

At 440, server 405 may send the data to large object data store 415 based on determining the data is larger than (or equal to) the threshold. In some cases, server 405 may send the associated data identifier with the data. At 445, large object data store 415 may store the data and, in some cases, the associated data identifier. Large object data store 415 may store the data at the location referenced by the intent message in the small object data store 410.

At 450, large object data store 415 may verify that the data has been successfully written at the referenced location. Large object data store 415 may send a confirmation message to small object data store 410 confirming that the data has been written as intended.

At 455, small object data store 410 may update the intent message. Updating the intent message may include modifying the intent message to indicate the data has been completely written to large object data store 415 at the referenced location. In some cases, small object data store 410 may update the intent message based on receiving the confirmation message from large object data store 415. In other cases, small object data store 410 may periodically identify any intent messages that have not yet been updated, check the referenced location in large object data store 415, and determine if the data has been written completely. Small object data store 410 may update the intent message if it determines the data has been written to large object data store 415. In some cases, if small object data store 410 determines that the data has not been written to large object data store 415, small object data store 410 may delete the intent message from its data storage.

Figure 5:
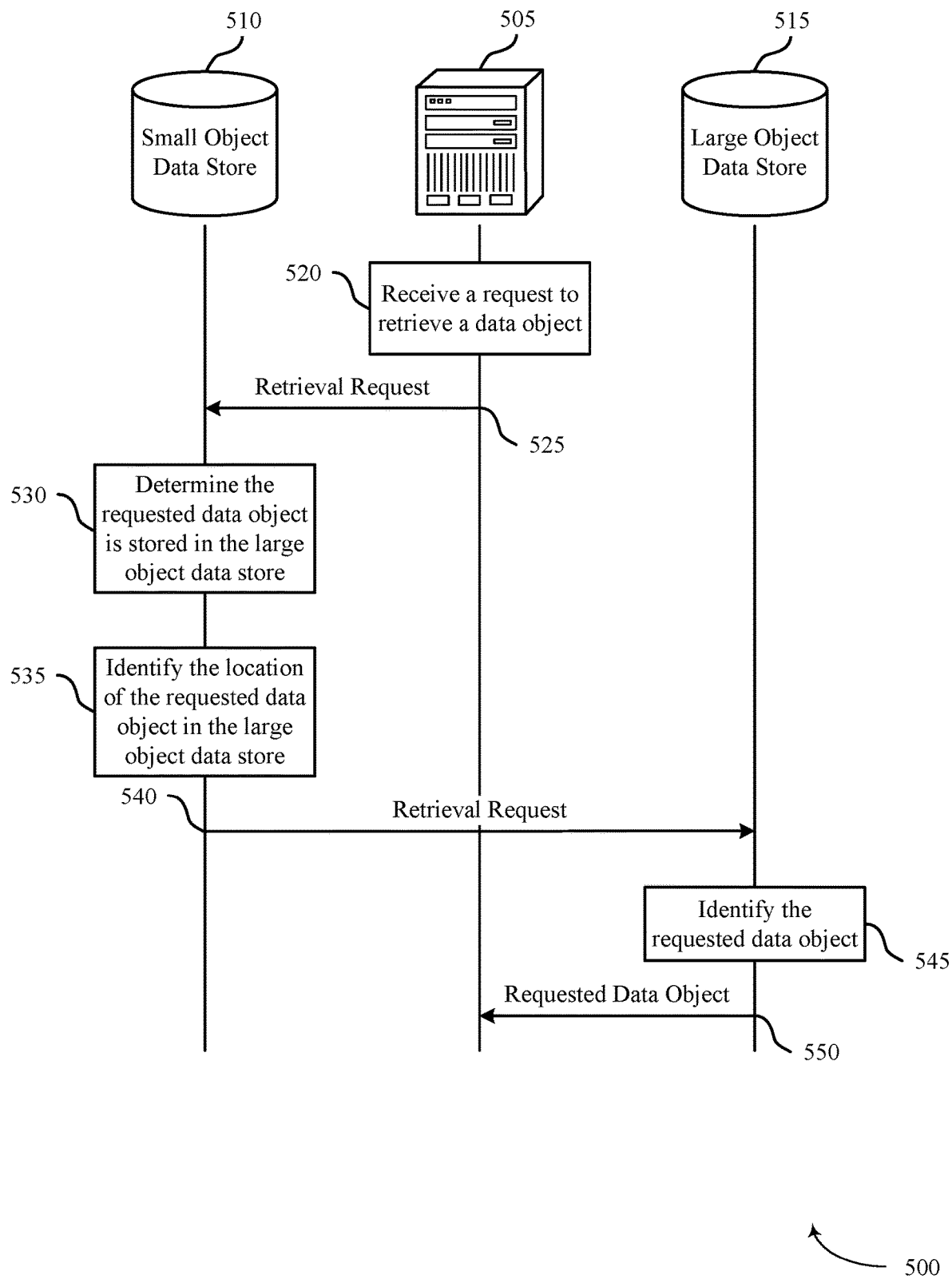

FIG. 5 illustrates an example of a process flow 500 that supports synchronizing data stores for different size data objects in accordance with various aspects of the present disclosure. Server 505 may be an example of a server 205, as described with reference to FIG. 2, and may be a component of any part of a system 125, as described with reference to FIG. 1. Small object data store 510 and large object data store 515 may be examples of the small object data store 210 and the large object data store 215, respectively, as described with reference to FIG. 2. In some cases, these may be components of a data center 120, as described with reference to FIG. 1. Process flow 500 illustrates an example of retrieving a data object from a large object data store 515 in a system configured to synchronize data stores for different size data objects.

At 520, server 505 may receive a request to retrieve a data object that is stored in one of the data stores. In some cases, the request to receive a data object may be an example of a retrieval query. The request to retrieve the data object may include a data identifier associated with the data object. At 525, server 505 may send the retrieval request to small object data store 510.

At 530, small object data store 510 may determine the data object is stored in large object data store 515. For example, small object data store 510 may write data as key-value pairs. Small object data store 510 may search the keys of the key-value pairs for the data identifier included in the retrieval request. Small object data store 510 may identify the data identifier in a key of a key-value pair. The value of the identified key-value pair may contain a reference to a location in large object data store 515. Small object data store 510 may determine the data object is stored in large object data store 515 based on the reference. At 535, small object data store 510 may identify the location of the data object in large object data store 515 based on the referenced location in the value of the key-value pair.

It should be noted that in some cases (e.g., when the data object is smaller than a predetermined threshold size), the data object may be stored in small object data store 510. In these cases, the value of the identified key-value pair may contain the data object. Small object data store 510 may send the data object to server 505 based on identifying it in the key-value pair.

At 540, when the data object is determined to be stored in large object data store 515, small object data store 510 may send the retrieval request to large object data store 515. In some cases, small object data store 510 may include the referenced location with the retrieval request. At 545, large object data store 515 may identify the data object. The data object may be identified based on searching at the referenced location in large object data store 515. At 545, large object data store 550 may send the identified data object to server 505.

Figure 6:
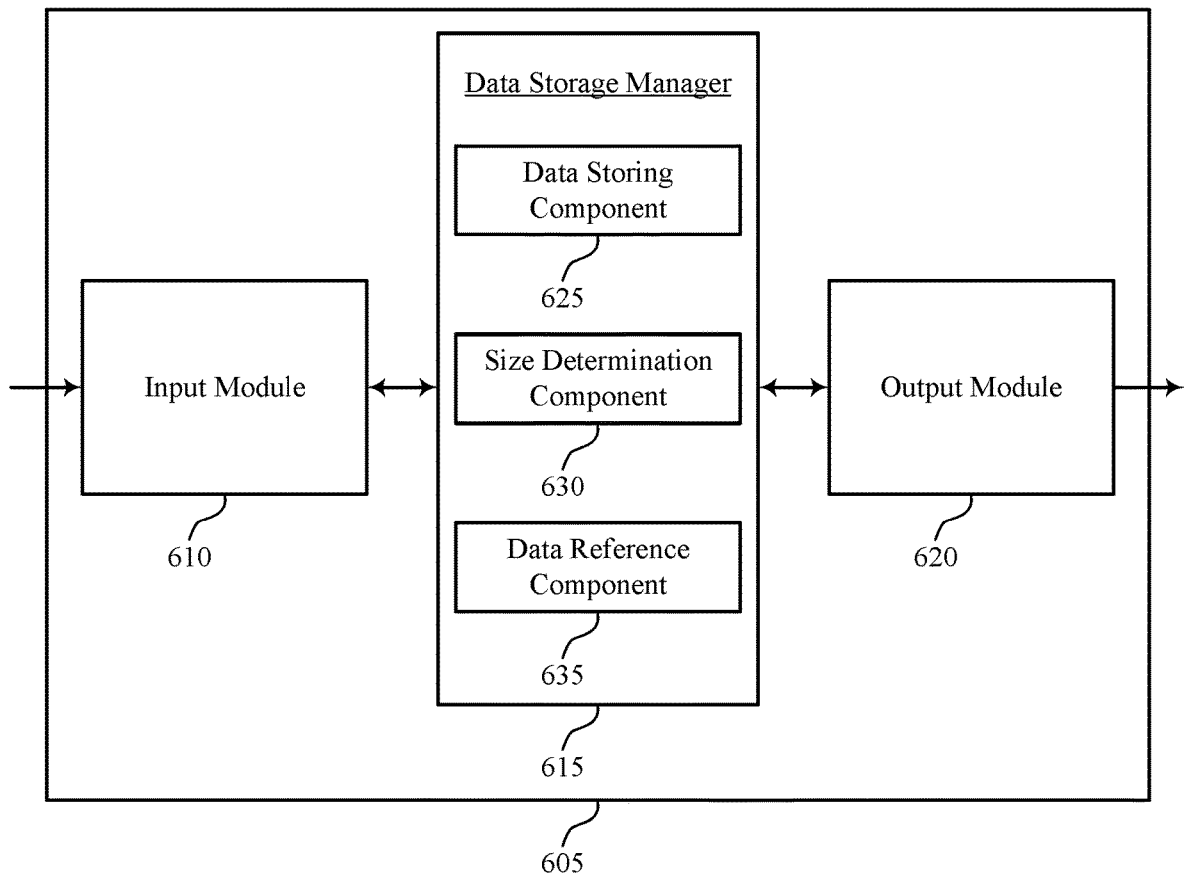
FIG. 6 shows a block diagram of a system that supports synchronizing data stores for different size data objects in accordance with aspects of the present disclosure.

FIG. 6 shows a block diagram 600 of a system 605 that supports synchronizing data stores for different size data objects in accordance with various aspects of the present disclosure. System 605 may include input module 610, data storage manager 615, and output module 620. System 605 may also include a processor. Each of these components may be in communication with one another (e.g., via one or more buses). In some cases, system 605 may be an example of a user terminal, a database server, or a system containing multiple computing devices. Data storage manager 615 may be an example of aspects of the data storage manager 815 described with reference to FIG. 8. Data storage manager 615 may also include data storing component 625, size determination component 630, and data reference component 635.

Data storage manager 615 and/or at least some of its various sub-components may be implemented in hardware, software executed by a processor, firmware, or any combination thereof. If implemented in software executed by a processor, the functions of the data storage manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data storage manager 615 and/or at least some of its various sub-components may be physically located at various positions, including being distributed such that portions of functions are implemented at different physical locations by one or more physical devices. In some examples, data storage manager 615 and/or at least some of its various sub-components may be a separate and distinct component in accordance with various aspects of the present disclosure. In other examples, data storage manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Data storing component 625 may receive a first write request message and a second write request message, where the first write request message includes first data and a first data identifier, and where the second write request message includes second data and a second data identifier, write the first data and the first data identifier to a first database based on a determination that a size of the first data is below a threshold, and write the second data to a second database based on a determination that a size of the second data is above the threshold. In some cases, the first database includes an HBase database. In some cases, the second database includes a HDFS database.

Size determination component 630 may determine that the size of the first data is below the threshold, determine that the size of the second data is above the threshold, determine that the size of the first data is equal to a threshold, tune the threshold such that a predetermined percentage of a total number of data objects are written to the first database, and tune the threshold such that a predetermined percentage of a total size of data are written to the second database.

Data reference component 635 may write, to the first database, the second data identifier and a reference to the second database based on writing the second data to the second database and determine that the second data is written in the second database based on the reference to the second database.

Figure 7:
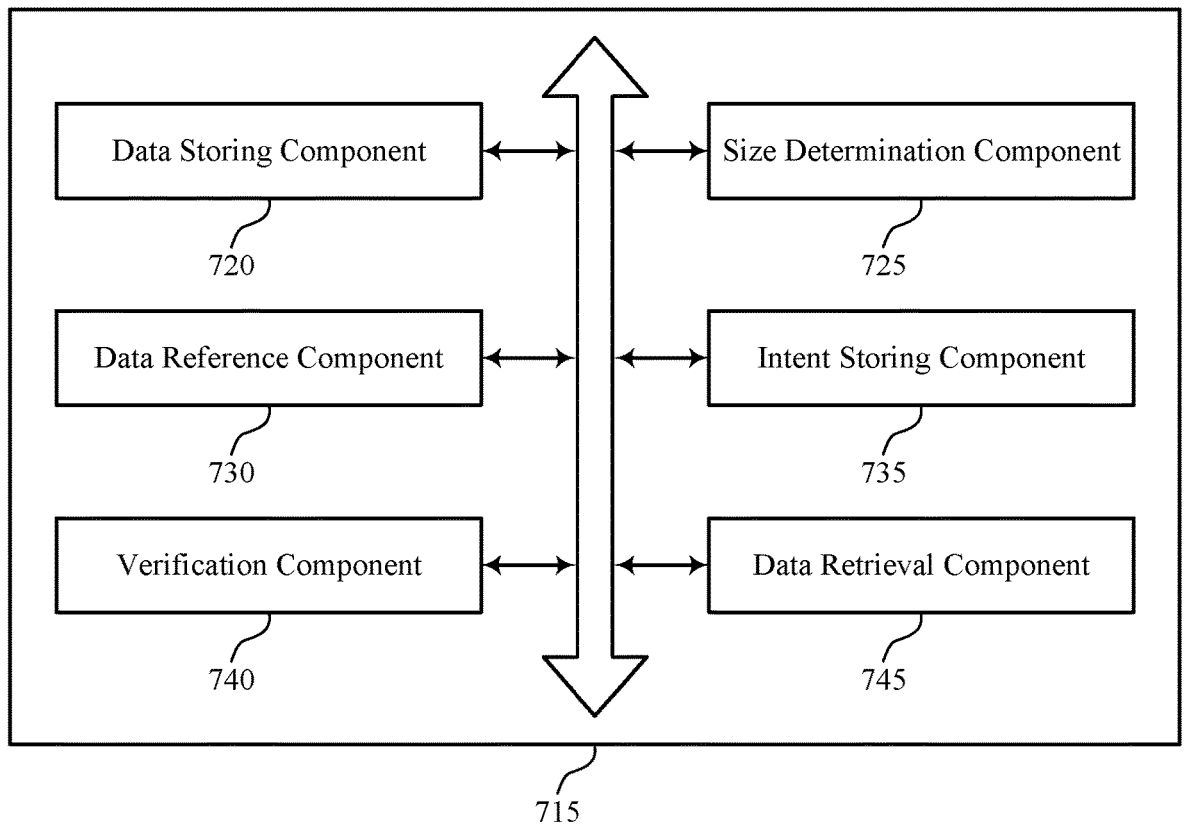
FIG. 7 shows a block diagram of a data storage manager that supports synchronizing data stores for different size data objects in accordance with aspects of the present disclosure.

FIG. 7 shows a block diagram 700 of a data storage manager 715 that supports synchronizing data stores for different size data objects in accordance with various aspects of the present disclosure. The data storage manager 715 may be an example of aspects of a data storage manager 615 or 815 described with reference to FIGS. 6 and 8. The data storage manager 715 may include data storing component 720, size determination component 725, data reference component 730, intent storing component 735, verification component 740, and data retrieval component 745. Each of these modules may communicate, directly or indirectly, with one another (e.g., via one or more buses).

Data storing component 720 may receive a first write request message and a second write request message, where the first write request message includes first data and a first data identifier, and where the second write request message includes second data and a second data identifier, write the first data and the first data identifier to a first database based on a determination that a size of the first data is below a threshold, and write the second data to a second database based on a determination that a size of the second data is above the threshold. In some cases, the first database includes an HBase database. In some cases, the second database includes a HDFS database.

Size determination component 725 may determine that the size of the first data is below the threshold, determine that the size of the second data is above the threshold, determine that the size of the first data is equal to the threshold, tune the threshold such that a predetermined percentage of a total number of data objects are written to the first database, and tune the threshold such that a predetermined percentage of a total size of data are written to the second database.

Data reference component 730 may write, to the first database, the second data identifier and a reference to the second database based on writing the second data to the second database and determine that the second data is written in the second database based on the reference to the second database.

Intent storing component 735 may write, to the first database, an intent message indicating an intent to write the second data to the second database and update the intent message to indicate that the second data was completely written to the second database. In some cases, the intent message includes the second data identifier and an intended location in the second database to write the second data.

Verification component 740 may verify that the second data was completely written to the second database.

Data retrieval component 745 may receive a retrieve query, where the retrieve query includes an indication of the second data identifier and retrieve the second data from the second database based on the retrieve query and the determination that the second data is written in the second database.

Figure 8:
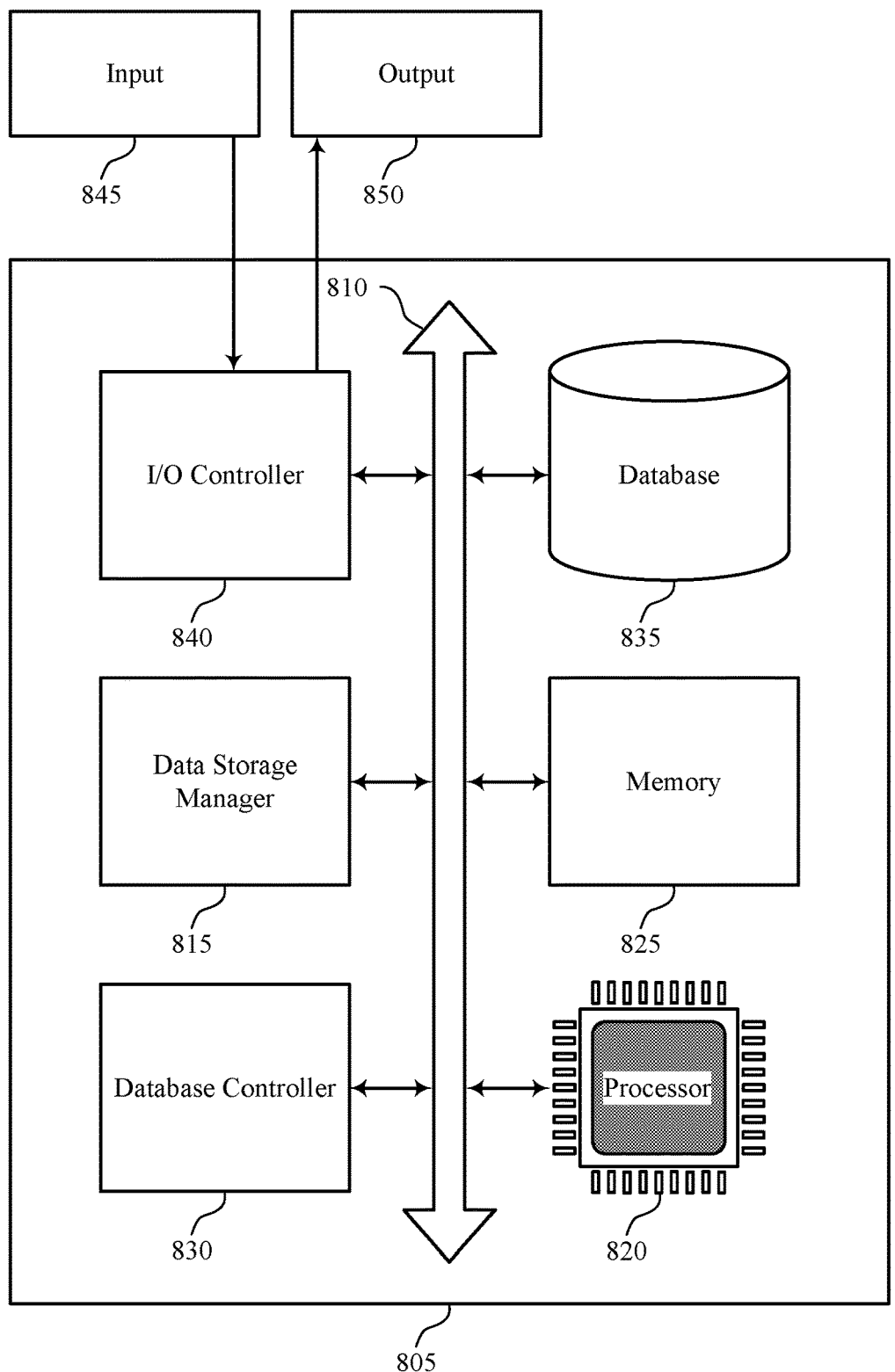
FIG. 8 illustrates a block diagram of an environment including a data storage manager that supports synchronizing data stores for different size data objects in accordance with aspects of the present disclosure.

FIG. 8 shows a diagram of an environment 800 including a system 805 that supports synchronizing data stores for different size data objects in accordance with various aspects of the present disclosure. System 805 may be an example of or include the components of system 125 as described above, e.g., with reference to FIG. 1. System 805 may include components for bi-directional data communications including components for transmitting and receiving communications, including data storage manager 815, processor 820, memory 825, database controller 830, database 835, and I/O controller 840. These components may be in electronic communication via one or more busses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting synchronizing data stores for different size data objects).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
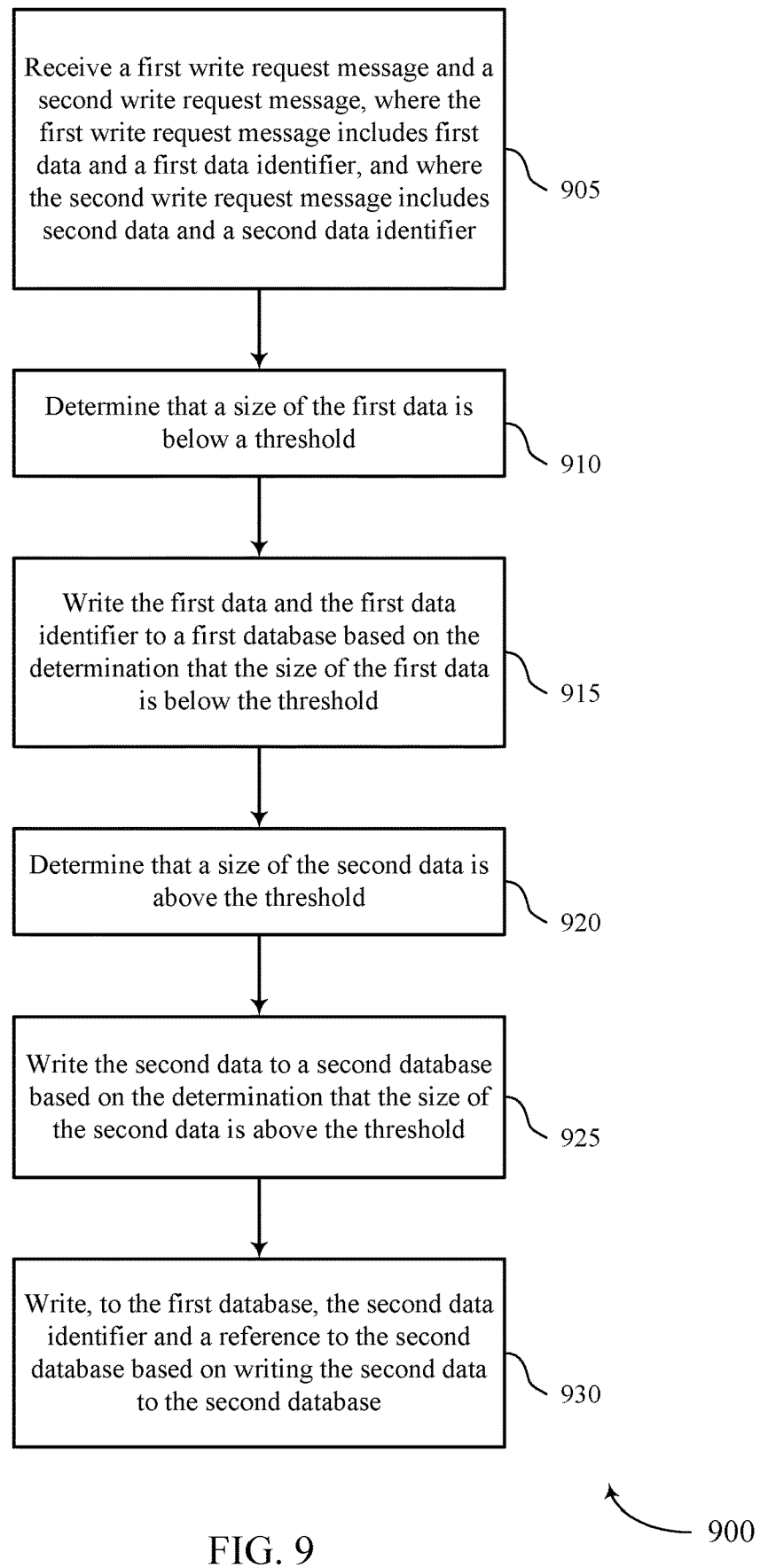
FIGS. 9 through 11 illustrate methods for synchronizing data stores for different size data objects in accordance with aspects of the present disclosure.

FIG. 9 shows a flowchart illustrating a method 900 for synchronizing data stores for different size data objects in accordance with various aspects of the present disclosure. The operations of method 900 may be implemented by a data storage manager or its components as described herein. For example, the operations of method 900 may be performed by a data storage manager 615, 715, or 815 as described with reference to FIGS. 6 through 8. In some examples, a data storage manager may execute a set of codes to control the functional elements of the device to perform the functions described below. Additionally or alternatively, the data storage manager may perform aspects of the functions described below using special-purpose hardware.

At block 905 the data storage manager 615, 715, or 815 may receive a first write request message and a second write request message, wherein the first write request message includes first data and a first data identifier, and wherein the second write request message includes second data and a second data identifier. The operations of block 905 may be performed according to the methods described with reference to FIGS. 1 through 5. In certain examples, aspects of the operations of block 905 may be performed by a data storing component as described with reference to FIGS. 6 through 8.

At block 910 the data storage manager 615, 715, or 815 may determine that a size of the first data is below a threshold. The operations of block 910 may be performed according to the methods described with reference to FIGS. 1 through 5. In certain examples, aspects of the operations of block 910 may be performed by a size determination component as described with reference to FIGS. 6 through 8.

At block 915 the data storage manager 615, 715, or 815 may write the first data and the first data identifier to a first database based at least in part on the determination that the size of the first data is below the threshold. The operations of block 915 may be performed according to the methods described with reference to FIGS. 1 through 5. In certain examples, aspects of the operations of block 915 may be performed by a data storing component as described with reference to FIGS. 6 through 8.

At block 920 the data storage manager 615, 715, or 815 may determine that a size of the second data is above the threshold. The operations of block 920 may be performed according to the methods described with reference to FIGS. 1 through 5. In certain examples, aspects of the operations of block 920 may be performed by a size determination component as described with reference to FIGS. 6 through 8.

At block 925 the data storage manager 615, 715, or 815 may write the second data to a second database based at least in part on the determination that the size of the second data is above the threshold. The operations of block 925 may be performed according to the methods described with reference to FIGS. 1 through 5. In certain examples, aspects of the operations of block 925 may be performed by a data storing component as described with reference to FIGS. 6 through 8.

At block 930 the data storage manager 615, 715, or 815 may write, to the first database, the second data identifier and a reference to the second database based at least in part on writing the second data to the second database. The operations of block 930 may be performed according to the methods described with reference to FIGS. 1 through 5. In certain examples, aspects of the operations of block 930 may be performed by a data reference component as described with reference to FIGS. 6 through 8.

Figure 10:
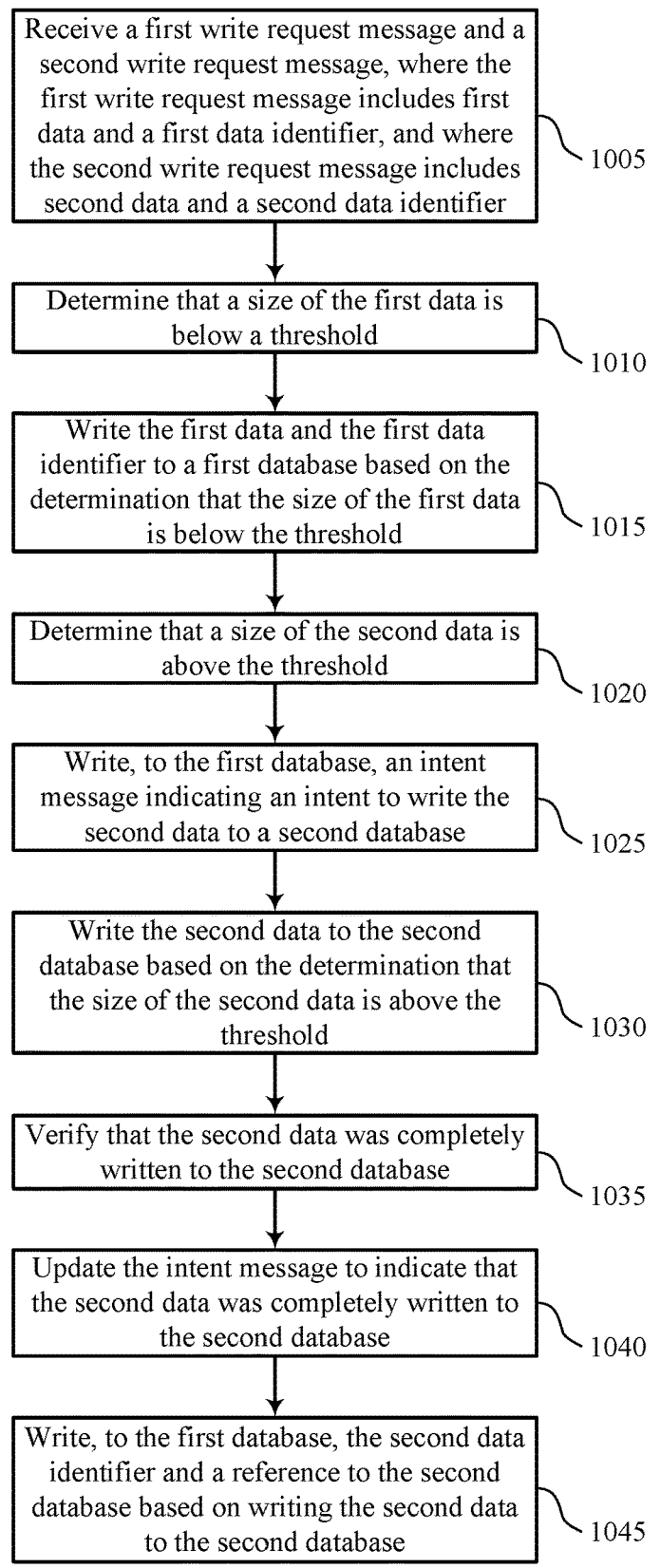

FIG. 10 shows a flowchart illustrating a method 1000 for synchronizing data stores for different size data objects in accordance with various aspects of the present disclosure. The operations of method 1000 may be implemented by a data storage manager or its components as described herein. For example, the operations of method 1000 may be performed by a data storage manager 615, 715, or 815 as described with reference to FIGS. 6 through 8. In some examples, a data storage manager may execute a set of codes to control the functional elements of the device to perform the functions described below. Additionally or alternatively, the data storage manager may perform aspects of the functions described below using special-purpose hardware.

At block 1005 the data storage manager 615, 715, or 815 may receive a first write request message and a second write request message, wherein the first write request message includes first data and a first data identifier, and wherein the second write request message includes second data and a second data identifier. The operations of block 1005 may be performed according to the methods described with reference to FIGS. 1 through 5. In certain examples, aspects of the operations of block 1005 may be performed by a data storing component as described with reference to FIGS. 6 through 8.

At block 1010 the data storage manager 615, 715, or 815 may determine that a size of the first data is below a threshold. The operations of block 1010 may be performed according to the methods described with reference to FIGS. 1 through 5. In certain examples, aspects of the operations of block 1010 may be performed by a size determination component as described with reference to FIGS. 6 through 8.

At block 1015 the data storage manager 615, 715, or 815 may write the first data and the first data identifier to a first database based at least in part on the determination that the size of the first data is below the threshold. The operations of block 1015 may be performed according to the methods described with reference to FIGS. 1 through 5. In certain examples, aspects of the operations of block 1015 may be performed by a data storing component as described with reference to FIGS. 6 through 8.

At block 1020 the data storage manager 615, 715, or 815 may determine that a size of the second data is above the threshold. The operations of block 1020 may be performed according to the methods described with reference to FIGS. 1 through 5. In certain examples, aspects of the operations of block 1020 may be performed by a size determination component as described with reference to FIGS. 6 through 8.

At block 1025 the data storage manager 615, 715, or 815 may write, to the first database, an intent message indicating an intent to write the second data to a second database. The operations of block 1025 may be performed according to the methods described with reference to FIGS. 1 through 5. In certain examples, aspects of the operations of block 1025 may be performed by an intent storing component as described with reference to FIGS. 6 through 8.

At block 1030 the data storage manager 615, 715, or 815 may write the second data to the second database based at least in part on the determination that the size of the second data is above the threshold. The operations of block 1030 may be performed according to the methods described with reference to FIGS. 1 through 5. In certain examples, aspects of the operations of block 1030 may be performed by a data storing component as described with reference to FIGS. 6 through 8.

At block 1035 the data storage manager 615, 715, or 815 may verify that the second data was completely written to the second database. The operations of block 1035 may be performed according to the methods described with reference to FIGS. 1 through 5. In certain examples, aspects of the operations of block 1035 may be performed by a verification component as described with reference to FIGS. 6 through 8.

At block 1040 the data storage manager 615, 715, or 815 may update the intent message to indicate that the second data was completely written to the second database. The operations of block 1040 may be performed according to the methods described with reference to FIGS. 1 through 5. In certain examples, aspects of the operations of block 1040 may be performed by an intent storing component as described with reference to FIGS. 6 through 8.

At block 1045 the data storage manager 615, 715, or 815 may write, to the first database, the second data identifier and a reference to the second database based at least in part on writing the second data to the second database. The operations of block 1045 may be performed according to the methods described with reference to FIGS. 1 through 5. In certain examples, aspects of the operations of block 1045 may be performed by a data reference component as described with reference to FIGS. 6 through 8.

Figure 11:
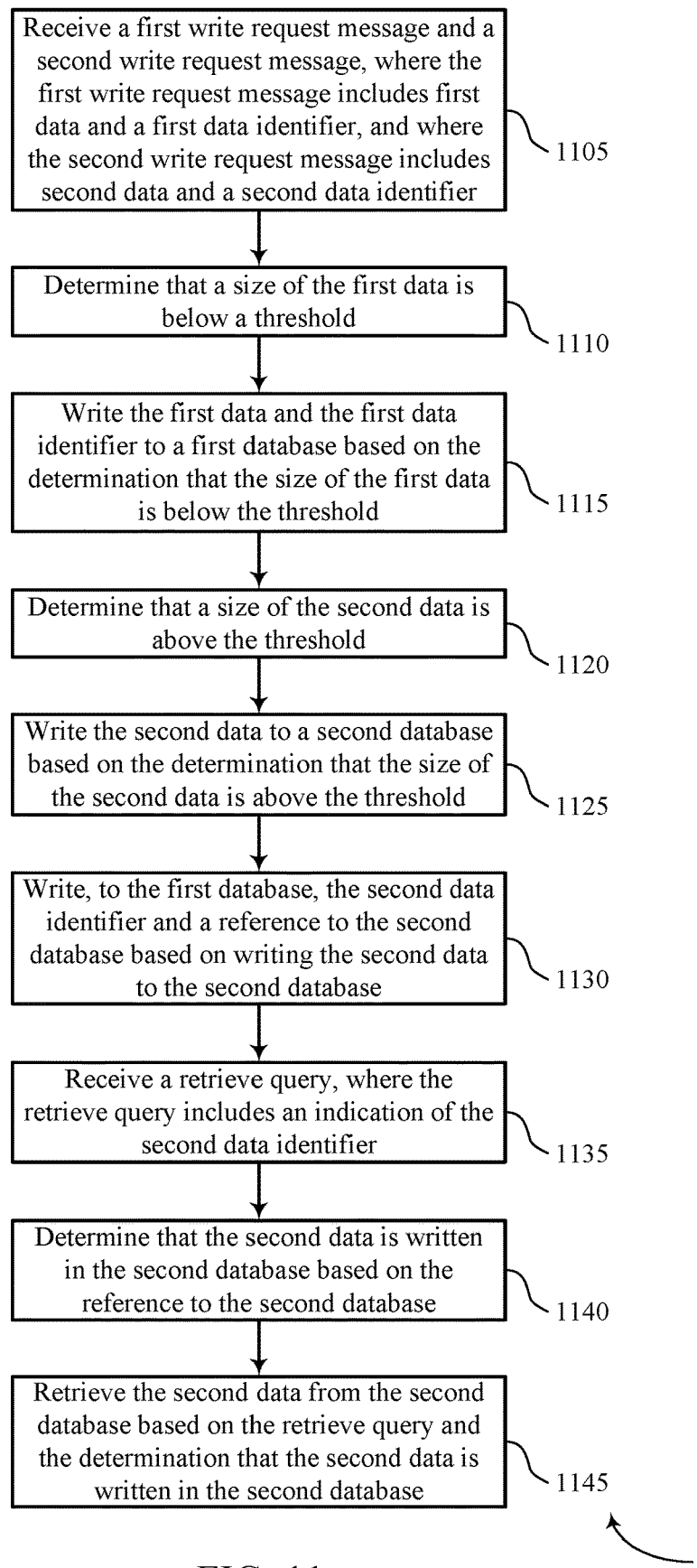

FIG. 11 shows a flowchart illustrating a method 1100 for synchronizing data stores for different size data objects in accordance with various aspects of the present disclosure. The operations of method 1100 may be implemented by a data storage manager or its components as described herein.

For example, the operations of method 1100 may be performed by a data storage manager 615, 715, or 815 as described with reference to FIGS. 6 through 8. In some examples, a data storage manager may execute a set of codes to control the functional elements of the device to perform the functions described below. Additionally or alternatively, the data storage manager may perform aspects of the functions described below using special-purpose hardware.

At block 1105 the data storage manager 615, 715, or 815 may receive a first write request message and a second write request message, wherein the first write request message includes first data and a first data identifier, and wherein the second write request message includes second data and a second data identifier. The operations of block 1105 may be performed according to the methods described with reference to FIGS. 1 through 5. In certain examples, aspects of the operations of block 1105 may be performed by a data storing component as described with reference to FIGS. 6 through 8.

At block 1110 the data storage manager 615, 715, or 815 may determine that a size of the first data is below a threshold. The operations of block 1110 may be performed according to the methods described with reference to FIGS. 1 through 5. In certain examples, aspects of the operations of block 1110 may be performed by a size determination component as described with reference to FIGS. 6 through 8.

At block 1115 the data storage manager 615, 715, or 815 may write the first data and the first data identifier to a first database based at least in part on the determination that the size of the first data is below the threshold. The operations of block 1115 may be performed according to the methods described with reference to FIGS. 1 through 5. In certain examples, aspects of the operations of block 1115 may be performed by a data storing component as described with reference to FIGS. 6 through 8.

At block 1120 the data storage manager 615, 715, or 815 may determine that a size of the second data is above the threshold. The operations of block 1120 may be performed according to the methods described with reference to FIGS. 1 through 5. In certain examples, aspects of the operations of block 1120 may be performed by a size determination component as described with reference to FIGS. 6 through 8.

At block 1125 the data storage manager 615, 715, or 815 may write the second data to a second database based at least in part on the determination that the size of the second data is above the threshold. The operations of block 1125 may be performed according to the methods described with reference to FIGS. 1 through 5. In certain examples, aspects of the operations of block 1125 may be performed by a data storing component as described with reference to FIGS. 6 through 8.

At block 1130 the data storage manager 615, 715, or 815 may write, to the first database, the second data identifier and a reference to the second database based at least in part on writing the second data to the second database. The operations of block 1130 may be performed according to the methods described with reference to FIGS. 1 through 5. In certain examples, aspects of the operations of block 1130 may be performed by a data reference component as described with reference to FIGS. 6 through 8.

At block 1135 the data storage manager 615, 715, or 815 may receive a retrieve query, wherein the retrieve query includes an indication of the second data identifier. The operations of block 1135 may be performed according to the methods described with reference to FIGS. 1 through 5. In certain examples, aspects of the operations of block 1135 may be performed by a data retrieval component as described with reference to FIGS. 6 through 8.

At block 1140 the data storage manager 615, 715, or 815 may determine that the second data is written in the second database based at least in part on the reference to the second database. The operations of block 1140 may be performed according to the methods described with reference to FIGS. 1 through 5. In certain examples, aspects of the operations of block 1140 may be performed by a data reference component as described with reference to FIGS. 6 through 8.

At block 1145 the data storage manager 615, 715, or 815 may retrieve the second data from the second database based at least in part on the retrieve query and the determination that the second data is written in the second database. The operations of block 1145 may be performed according to the methods described with reference to FIGS. 1 through 5. In certain examples, aspects of the operations of block 1145 may be performed by a data retrieval component as described with reference to FIGS. 6 through 8.

A method of data processing is described. The method may include receiving a first write request message and a second write request message, wherein the first write request message includes first data and a first data identifier, and wherein the second write request message includes second data and a second data identifier, determining that a size of the first data is below a threshold, writing the first data and the first data identifier to a first database based at least in part on the determination that the size of the first data is below the threshold, determining that a size of the second data is above the threshold, writing the second data to a second database based at least in part on the determination that the size of the second data is above the threshold, and writing, to the first database, the second data identifier and a reference to the second database based at least in part on writing the second data to the second database.

Another apparatus for data processing is described. The apparatus may include a processor, memory in electronic communication with the processor, and instructions stored in the memory. The instructions may be operable to cause the processor to receive a first write request message and a second write request message, wherein the first write request message includes first data and a first data identifier, and wherein the second write request message includes second data and a second data identifier, determine that a size of the first data is below a threshold, write the first data and the first data identifier to a first database based at least in part on the determination that the size of the first data is below the threshold, determine that a size of the second data is above the threshold, write the second data to a second database based at least in part on the determination that the size of the second data is above the threshold, and write, to the first database, the second data identifier and a reference to the second database based at least in part on writing the second data to the second database.

A non-transitory computer readable medium for data processing is described. The non-transitory computer-readable medium may include instructions operable to cause a processor to receive a first write request message and a second write request message, wherein the first write request message includes first data and a first data identifier, and wherein the second write request message includes second data and a second data identifier, determine that a size of the first data is below a threshold, write the first data and the first data identifier to a first database based at least in part on the determination that the size of the first data is below the threshold, determine that a size of the second data is above the threshold, write the second data to a second database based at least in part on the determination that the size of the second data is above the threshold, and write, to the first database, the second data identifier and a reference to the second database based at least in part on writing the second data to the second database.

Some examples of the method, apparatus, and non-transitory computer-readable medium described above may further include processes, features, means, or instructions for writing, to the first database, an intent message indicating an intent to write the second data to the second database.

In some examples of the method, apparatus, and non-transitory computer-readable medium described above, the intent message comprises the second data identifier and an intended location in the second database to write the second data.

Some examples of the method, apparatus, and non-transitory computer-readable medium described above may further include processes, features, means, or instructions for verifying that the second data was completely written to the second database. Some examples of the method, apparatus, and non-transitory computer-readable medium described above may further include processes, features, means, or instructions for updating the intent message to indicate that the second data was completely written to the second database.

Some examples of the method, apparatus, and non-transitory computer-readable medium described above may further include processes, features, means, or instructions for tuning the threshold such that a predetermined percentage of a total number of data objects may be written to the first database.

Some examples of the method, apparatus, and non-transitory computer-readable medium described above may further include processes, features, means, or instructions for tuning the threshold such that a predetermined percentage of a total size of data may be written to the second database.

Some examples of the method, apparatus, and non-transitory computer-readable medium described above may further include processes, features, means, or instructions for receiving a retrieve query, wherein the retrieve query includes an indication of the second data identifier. Some examples of the method, apparatus, and non-transitory computer-readable medium described above may further include processes, features, means, or instructions for determining that the second data may be written in the second database based at least in part on the reference to the second database. Some examples of the method, apparatus, and non-transitory computer-readable medium described above may further include processes, features, means, or instructions for retrieving the second data from the second database based at least in part on the retrieve query and the determination that the second data may be written in the second database.

In some examples of the method, apparatus, and non-transitory computer-readable medium described above, the first database comprises an HBase database.

In some examples of the method, apparatus, and non-transitory computer-readable medium described above, the second database comprises a HDFS database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
  receiving a first write request message and a second write request message, wherein the first write request message includes first data and a first data identifier, and wherein the second write request message includes second data and a second data identifier;
  determining that a size of the first data is below a threshold;
  writing the first data and the first data identifier to a first database based at least in part on the determination that the size of the first data is below the threshold;
  determining that a size of the second data is above the threshold;
  writing the second data to a second database based at least in part on the determination that the size of the second data is above the threshold, wherein the second database is different from the first database;
  writing, to the first database, the second data identifier and a reference to the second database based at least in part on writing the second data to the second database;
  receiving a retrieval request message for the second data;
  sending, to the first database, a retrieval query for the second data based at least in part on the retrieval request message;
  sending, from the first database to the second database, the retrieval query for the second data based at least in part on the reference to the second database; and
  receiving, from the second database, the second data based at least in part on writing the second data to the second database and sending the retrieval query from the first database to the second database.

2. The method of claim 1, further comprising:
  writing, to the first database, an intent message indicating an intent to write the second data to the second database.

3. The method of claim 2, wherein the intent message comprises the second data identifier and an intended location in the second database to write the second data.

4. The method of claim 2, further comprising:
  verifying that the second data was completely written to the second database; and
  updating the intent message to indicate that the second data was completely written to the second database.

5. The method of claim 1, further comprising:
  tuning the threshold such that a predetermined percentage of a total number of data objects are written to the first database.

6. The method of claim 1, further comprising:
  tuning the threshold such that a predetermined percentage of a total size of data are written to the second database.

7. The method of claim 1, wherein the first database comprises an HBase database.

8. The method of claim 1, wherein the second database comprises a Hadoop Distributed File System (HDFS) database.

9. The method of claim 1, wherein:
  the first database is optimized to store data files smaller than the threshold; and
  the second database is optimized to store data files larger than the threshold.

10. The method of claim 1, wherein writing, to the first database, the second data identifier comprises:
  writing metadata for the second data to the first database, wherein the metadata comprises the second data identifier.

11. An apparatus for data processing, in a system comprising:
  a processor;
  memory in electronic communication with the processor; and
  instructions stored in the memory and operable, when executed by the processor, to cause the apparatus to:
  receive a first write request message and a second write request message, wherein the first write request message includes first data and a first data identifier, and wherein the second write request message includes second data and a second data identifier;
  determine that a size of the first data is below a threshold;
  write the first data and the first data identifier to a first database based at least in part on the determination that the size of the first data is below the threshold;
  determine that a size of the second data is above the threshold;
  write the second data to a second database based at least in part on the determination that the size of the second data is above the threshold, wherein the second database is different from the first database;
  write, to the first database, the second data identifier and a reference to the second database based at least in part on writing the second data to the second database;
  receive a retrieval request message for the second data;

send, to the first database, a retrieval query for the second data based at least in part on the retrieval request message;

send, from the first database to the second database, the retrieval query for the second data based at least in part on the reference to the second database; and receive, from the second database, the second data based at least in part on writing the second data to the second database and sending the retrieval query from the first database to the second database.

12. The apparatus of claim 11, wherein the instructions are further executable by the processor to:

write, to the first database, an intent message indicating an intent to write the second data to the second database.

13. The apparatus of claim 12, wherein the intent message comprises the second data identifier and an intended location in the second database to write the second data.

14. The apparatus of claim 12, wherein the instructions are further executable by the processor to:

verify that the second data was completely written to the second database; and update the intent message to indicate that the second data was completely written to the second database.

15. The apparatus of claim 11, wherein the instructions are further executable by the processor to:

tune the threshold such that a predetermined percentage of a total number of data objects are written to the first database.

16. The apparatus of claim 11, wherein the instructions are further executable by the processor to:

tune the threshold such that a predetermined percentage of a total size of data are written to the second database.

17. A non-transitory computer readable medium storing code for data processing, the code comprising instructions executable by a processor to:

receive a first write request message and a second write request message, wherein the first write request message includes first data and a first data identifier, and wherein the second write request message includes second data and a second data identifier;

determine that a size of the first data is below a threshold;

write the first data and the first data identifier to a first database based at least in part on the determination that the size of the first data is below the threshold;

determine that a size of the second data is above the threshold;

write the second data to a second database based at least in part on the determination that the size of the second data is above the threshold, wherein the second database is different from the first database;

write, to the first database, the second data identifier and a reference to the second database based at least in part on writing the second data to the second database;

receive a retrieval request message for the second data;

send, to the first database, a retrieval query for the second data based at least in part on the retrieval request message;

send, from the first database to the second database, the retrieval query for the second data based at least in part on the reference to the second database; and receive, from the second database, the second data based at least in part on writing the second data to the second database and sending the retrieval query from the first database to the second database.

18. The non-transitory computer-readable medium of claim 17, wherein the instructions are further executable by the processor to:

write, to the first database, an intent message indicating an intent to write the second data to the second database.

19. The non-transitory computer-readable medium of claim 18, wherein the instructions are further executable by the processor to:

verify that the second data was completely written to the second database; and update the intent message to indicate that the second data was completely written to the second database.

* * * * *